(12) United States Patent
Chen et al.

(10) Patent No.: US 12,044,387 B1
(45) Date of Patent: Jul. 23, 2024

(54) BACKLIGHT MODULE, ASSEMBLY METHOD OF BACKLIGHT MODULE AND DISPLAY

(71) Applicant: HKC CORPORATION LIMITED, Shenzhen (CN)

(72) Inventors: Qinglin Chen, Shenzhen (CN); Rongrong Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/343,448

(22) Filed: Jun. 28, 2023

(30) Foreign Application Priority Data

Feb. 27, 2023 (CN) .......................... 202310167644.9

(51) Int. Cl.
| | | |
|---|---|---|
| G02F 1/1333 | (2006.01) | |
| F21V 19/00 | (2006.01) | |
| F21V 21/03 | (2006.01) | |
| F21V 21/04 | (2006.01) | |
| F21V 21/22 | (2006.01) | |
| G02F 1/13357 | (2006.01) | |
| F21V 33/00 | (2006.01) | |

(52) U.S. Cl.
CPC ........ *F21V 21/047* (2013.01); *F21V 19/0005* (2013.01); *F21V 21/03* (2013.01); *F21V 21/22* (2013.01); *G02F 1/133317* (2021.01); *G02F 1/133608* (2013.01); *F21V 33/0052* (2013.01)

(58) Field of Classification Search
CPC ......... G02F 1/133608; G02F 1/133314; G02F 1/133317
See application file for complete search history.

(56) References Cited

U.S. PATENT DOCUMENTS

| | | |
|---|---|---|
| 6,538,710 B1 | 3/2003 | Jang |
| 2014/0084760 A1* | 3/2014 | Yu .................. H05K 5/0017 312/7.2 |

FOREIGN PATENT DOCUMENTS

| | | |
|---|---|---|
| CN | 104570437 A | 4/2015 |
| CN | 209216447 U | 8/2019 |
| CN | 111766742 A | 10/2020 |
| CN | 214954448 U | 11/2021 |
| CN | 216526644 U | 5/2022 |
| CN | 217467426 U | 9/2022 |
| TW | 200712682 A | 4/2007 |

OTHER PUBLICATIONS

Second Office Action issued in counterpart Chinese Patent Application No. 202310167644.9, dated Apr. 29, 2023.
First Office Action issued in counterpart Chinese Patent Application No. 202310167644.9, dated Apr. 13, 2023.

* cited by examiner

*Primary Examiner* — Sean P Gramling
(74) *Attorney, Agent, or Firm* — Westbridge IP LLC

(57) ABSTRACT

Disclosed are a backlight module, an assembly method of a backlight module and a display. The backlight module includes a backplane, a lamp plate and an optical diaphragm, the backplane includes a bottom cover and an upper frame, the lamp plate is mounted on the bottom cover, the upper frame is detachably connected above the bottom cover, the optical diaphragm is mounted on the upper frame and provided opposite to the lamp plate.

6 Claims, 5 Drawing Sheets

| providing the backplate, the lamp plate, and the optical diaphragm | — S10 |

| disassembling the bottom cover and the upper frame of the backplate | — S20 |

| mounting the lamp plate to the bottom cover and the optical diaphragm to the upper frame | — S30 |

| connecting the bottom cover to the upper frame | — S40 |

BACKLIGHT MODULE, ASSEMBLY METHOD OF BACKLIGHT MODULE AND DISPLAY

CROSS-REFERENCE TO RELATED APPLICATIONS

This application claims priority to Chinese Patent Application No. 202310167644.9, filed on Feb. 27, 2023, the entire contents of which are incorporated herein by reference.

TECHNICAL FIELD

The present application relates to the technical field of display, in particular to a backlight module, an assembly method based on the backlight module and a display applying the backlight module.

BACKGROUND

With the improvement of people's living standard, more and more display devices are applied to people's life. The display device includes a backlight module and a display plate, and the backlight module includes a backplane, a lamp plate and an optical diaphragm, etc. The lamp plate is located below the optical diaphragm, and both the lamp plate and the optical diaphragm are located in the cavity formed by the backplane. The display plate is glued to the backplane or a middle frame connected to the backplane by adhesive and located above the optical diaphragm. However, the traditional backplane is usually integratedly formed, when the lamp plate or the optical diaphragm is abnormal and need to be repaired and replaced, it needs to use tools to remove the adhesive first, and then remove the diaphragm, the operations are cumbersome, and will damage the display plate or backlight module when serious.

SUMMARY

The main purpose of the application is to propose a backplane assembly, aiming to solve the problem that the maintenance and replacement of the optical diaphragm or the lamp plate are cumbersome.

In order to achieve the purpose, the present application provides a backlight module, including a backplane, a lamp plate and an optical diaphragm. The backplane includes: a bottom cover, and an upper frame detachably connected above the bottom cover. The lamp plate is mounted on the bottom cover, and the optical diaphragm is mounted on the upper frame and opposite to the lamp plate.

In an embodiment, one of the bottom cover and the upper frame is provided with a mounting hole, and the other of the bottom cover and the upper frame is provided with an insertion hole; the backlight module further includes an elastic telescopic column assembly extending in a horizontal direction; an end of the elastic telescopic column assembly is fixed in the mounting hole, and another end of the elastic telescopic column assembly is extendable out of the mounting hole and extended into the insertion hole; or another end of the elastic telescopic column assembly is retractable into the mounting hole to separate from the insertion hole.

In an embodiment, the bottom cover is provided with the mounting hole, and the upper frame is provided with the insertion hole;
the elastic telescopic column assembly includes a fixed portion; an elastic member, and a pin;
the fixed portion is fixed in the mounting hole, an end of the elastic member is connected to the fixed portion; and an end of the pin is connected to an end of the elastic member away from the fixed portion and is extended horizontally, another end of the pin is extendable out of the mounting hole and extended into the insertion hole; or another end of the pin is retractable into the mounting hole to separate from the insertion hole.

In an embodiment, the bottom cover is provided with an avoidance hole, the avoidance hole is in communication with the mounting hole, a bottom of the pin is provided with a mating slot; and a slot opening of the mating slot is in communication with the avoidance hole, suitable for an operational tool extending into the avoidance hole and the mating slot for stirring the elastic telescopic column assembly.

In an embodiment, a slot wall of the mating slot towards the avoidance hole is a first inclined plane, and a side of the first inclined plane close to the elastic member is inclined close to the bottom cover.

In an embodiment, an end of the pin away from the elastic member is formed with a second inclined plane, and a side of the second inclined plane close to the elastic member is inclined away from the bottom cover.

In an embodiment, the upper frame is provided with a limiting portion protruded from an inner edge of the upper frame; the backlight module further includes a support member, and the support member is detachably connected to the upper frame and provided on a side of the limiting portion close to the bottom cover; and the optical diaphragm is sandwiched between the support member and the limiting portion.

In an embodiment, the support member includes a support sheet, and a connection sheet;
  the support sheet is provided opposite to the limiting portion and provided on the side of the limiting portion close to the bottom cover, and the optical diaphragm is sandwiched between the support sheet and the limiting portion; and
  the connection sheet is vertically connected to the support sheet and screwed to the upper frame.

The present application also provides an assembly method of the backlight module as mentioned above, including:
  providing the backplane, the lamp plate, and the optical diaphragm;
  disassembling the bottom cover and the upper frame of the backplane;
  mounting the lamp plate to the bottom cover and the optical diaphragm to the upper frame; and
  connecting the bottom cover to the upper frame.

The present application also provides a display, including a display plate and the backlight module as mentioned above, the display plate is provided on the side of the optical diaphragm away from the lamp plate.

The technical solution of the present application sets the backlight to the bottom cover and the upper frame that are detachably connected. The lamp plate is mounted on the bottom cover and the optical diaphragm is mounted on the upper frame, then when the optical diaphragm and/or the lamp plate need to be serviced and disassembled, only the bottom cover and the upper frame need to be disassembled, there is no need to remove the adhesive and then remove the display plate and the optical diaphragm, and finally the optical diaphragm and/or the lamp plate can be serviced, thus the disassembly steps are reduced, and the risk of serious damage to the optical diaphragm and the display plate during disassembly is also reduced.

BRIEF DESCRIPTION OF THE DRAWINGS

In order to more clearly illustrate the technical solutions in the embodiments of the present application or related art, the following is a brief description of the accompanying drawings in the description of the embodiments or related art, it will be obvious that the accompanying drawings in the following description are only some embodiments of the present application, and that other structures can be obtained according to the structure illustrated in these drawings for those skilled in the art without any creative work.

Figure 1:
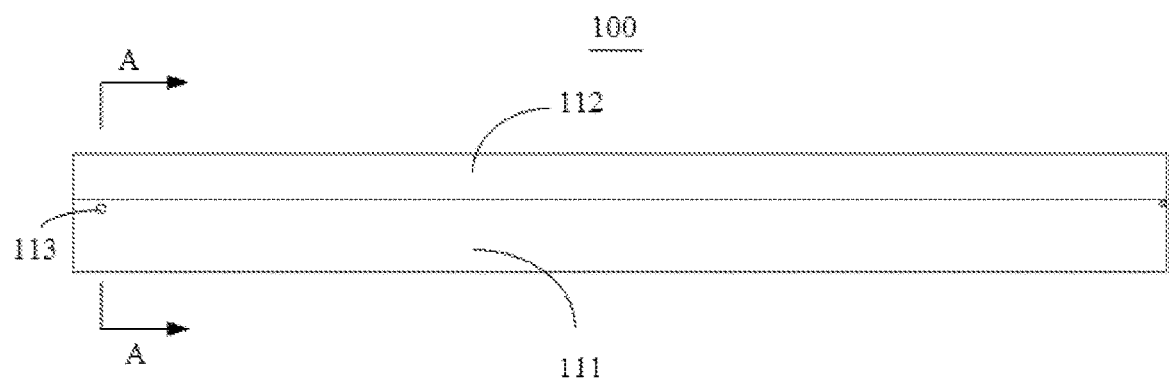
FIG. 1 is a left view of a backlight module according to an embodiment of the present application.

The realization of the purpose, functional features and advantages of the present application will be further described with reference to the accompanying drawings, in conjunction with the embodiments.

DETAILED DESCRIPTION OF THE EMBODIMENTS

The technical solutions in the embodiments of the present application will be clearly and completely described below in conjunction with the accompanying drawings in the embodiments of the present application, and it is clear that the described embodiments are only a part of the embodiments of the present application, and not all of them. Based on the embodiments in the present application, all other embodiments obtained by those skilled in the art without making creative labor fall within the scope of the present application.

It should be noted that if there are embodiments of the present application involving directional indications (such as up, down, left, right, forward, back . . . ), the directional indications are used only to explain the relative position relationship, movement, etc. between the parts in a particular attitude (as shown in the attached drawings), and if the particular attitude is changed, the directional indication is changed accordingly.

In addition, if there is a description of "first", "second", etc. in an embodiment of the present application, the description of "first", "second", etc. is used only for descriptive purposes and is not to be understood as indicating or implying its relative importance or implicitly specifying the number of indicated technical features. Thus, features defined with "first" and "second" may explicitly or implicitly include at least one such feature. In addition, the technical solutions of each embodiment may be combined with each other, but only on the basis that they can be realized by those skilled in the art, and when the combination of technical solutions is contradictory or unrealizable, it shall be considered that such combination of technical solutions does not exist and is not within the scope of the present application.

First Embodiment

The present application proposes a backlight module 100.

In the embodiment, referring to FIG. 1 to FIG. 8, the backlight module 100 includes a backplane 110, a lamp plate 130 and an optical diaphragm 140. The backplane 110 includes a bottom cover 111 and an upper frame 112, and the lamp plate 130 is mounted on the bottom cover 111; the upper frame 112 is detachably connected above the bottom cover 111. The optical diaphragm 140 is mounted on the upper frame 112 and opposite to the lamp plate 130.

It should be noted that the "top" and "bottom" in the technical solution of the present application are based on the state when installation, i.e., based on the state that the bottom cover 111 of the backplane 110 is located on a side close to the ground, and the upper frame 112 is located on a side of the bottom cover 111 away from the ground. The bottom cover 111 of the backplane 110 is detachably connected to the upper frame 112, the bottom cover 111 and the upper frame 112 of the backplane 110 are easily to be disassembled, so that the lamp plate 130 on the bottom cover 111 can be disassembled with the optical diaphragm 140 on the upper frame 112 due to the bottom cover 111 being disassembled with the upper frame 112. When the optical diaphragm 140 or the lamp plate 130 needs to be serviced or disassembled, it is only necessary to disassemble the bottom cover 111 and the upper frame 112 of the back plate 110, at which time the optical diaphragm 140 can be serviced and disassembled directly, and the lamp plate 130 can be serviced and disassembled directly. Compared to the traditional way that the adhesive on the backlight module 100 attached to the display plate 200 is removed by tools first, the disassembly steps are reduced, and the optical diaphragm 140 or the display plate 200 will not be polluted during disassembly, and the optical diaphragm 140 and the display plate 200 will not be damaged. Specifically, the bottom cover 111 can include a bottom wall and a side wall, and the lamp plate 130 can be provided on the bottom wall or on the side wall. When the lamp plate 130 is provided on the bottom wall, the lamp plate 130 can include a plurality of light beads arranged in array, especially when a light bead of the lamp plate 130 is not bright and needs to be repaired, it only needs to disassemble the bottom cover 111 and the upper frame 112 to expose the lamp plate 130, then the effect of repairing the unlit light beads is achieved, without removing the display plate 200 and optical diaphragm 140 in turn to expose the lamp plate 130. Of course, the bottom cover 111 may also include only the bottom wall without the side wall. The upper frame 112 is used to mount the optical diaphragm 140, while the display plate 200 can also be mounted on the side of the upper frame 112 away from the bottom cover 111. The upper frame 112 has an opening, so that the optical diaphragm 140 processes the light emitted from the lamp plate 130 and then shines onto the display plate 200 to enable the display plate 200 to display the picture.

The upper frame 112 can be detachably connected to the bottom cover 111 by screw, snap or the pin 1133. For example, when the upper frame 112 is connected to the bottom cover 111 by screws, a threaded hole can be opened at the bottom of the upper frame 112, and the bottom cover 111 has a through hole in communication with the threaded hole, and the screw is threaded through the through hole to fit the threaded hole, so as to achieve screw connection between the upper frame 112 and the bottom cover 111. When the upper frame 112 and the bottom cover 111 are connected by snap, the bottom of the upper frame 112 is nested with the bottom cover 111, and one of the upper frame 112 and the bottom cover 111 is convexly provided with a snap portion, and the other of them is provided with a snap hole, so that when the upper frame 112 is nested with the bottom cover 111, the snap portion is snapped into the snap hole at the same time. When the upper frame 112 and the bottom cover 111 are connected by the pin 1133, the upper frame 112 and the bottom cover 111 are first plugged together, and both the upper frame 112 and the bottom cover 111 are provided with the connection hole, and the pin 1133 is inserted into the connection hole of the upper frame 112 and the connection hole of the bottom cover 111, to achieve detachable connection between the upper frame 112 and the bottom cover 111. In order to facilitate user to disassemble and make the better stability of connection between the upper frame 112 and the bottom cover 111, the pin 1133 can be interference fit with the connection hole.

The technical solution of the present application sets the backlight 110 to the bottom cover 111 and the upper frame 112 that are detachably connected. The lamp plate 130 is mounted on the bottom cover 111 and the optical diaphragm 140 is mounted on the upper frame 112, then when the optical diaphragm 140 and/or the lamp plate 130 need to be serviced and disassembled, only the bottom cover 111 and the upper frame 112 need to be disassembled, there is no need to remove the adhesive and then remove the display plate 200 and the optical diaphragm 140, and finally the optical diaphragm 140 and/or the lamp plate 130 can be serviced, thus the disassembly steps are reduced, and the risk of serious damage to the optical diaphragm 140 and the display plate 200 during disassembly is also reduced.

Figure 2:
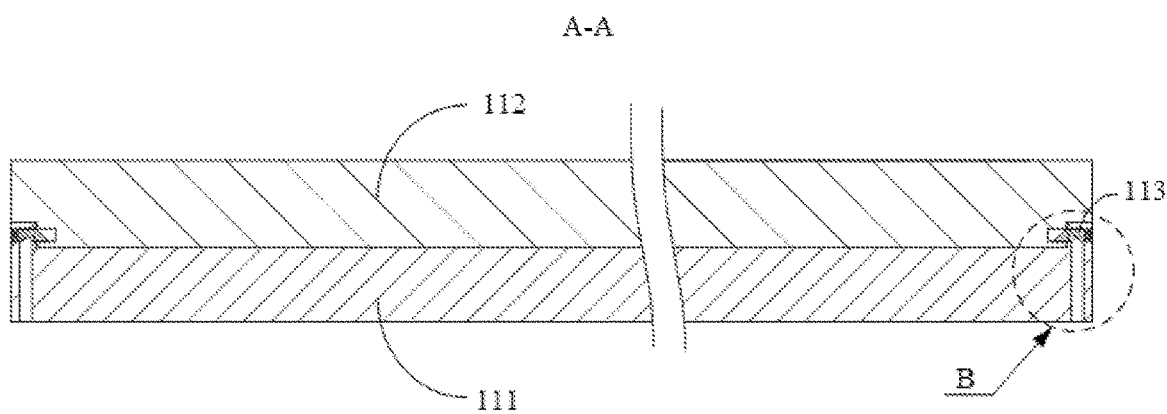
FIG. 2 is a cross-sectional view along line A-A in FIG. 1.
Figure 3:
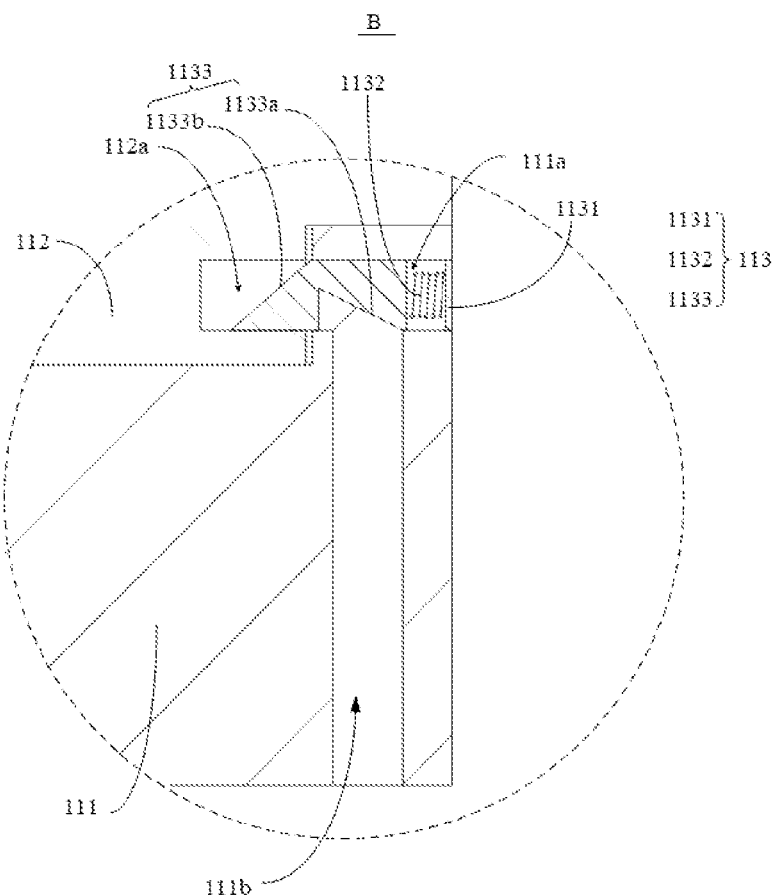
FIG. 3 is a partial enlarged view at position B in FIG. 2.

In an embodiment, referring to FIGS. 1 to 3, one of the bottom cover 111 and the upper frame 112 is provided with a mounting hole 111a, and the other of the bottom cover 111 and the upper frame 112 is provided with an insertion hole 112a; the backlight module 100 also includes an elastic telescopic column assembly 113 extending in a horizontal direction, and an end of the elastic telescopic column assembly 113 is fixed in the mounting hole 111a and another end of the elastic telescopic column assembly 113 is extendable out of the mounting hole 111a and extended into the insertion hole 112a, or another end of the elastic telescopic column assembly 113 is retractable into the mounting hole 111a to separate from the insertion hole 112a.

Specifically, the bottom cover 111 is provided with a mounting hole 111a, and the upper frame 112 is provided with the insertion hole 112a, and the end of the elastic telescopic column assembly is fixed in the mounting hole 111a of the bottom cover 111, and another end of the elastic telescopic column assembly can extend out of the mounting hole 111a and extend into the insertion hole 112a to achieve detachable connection between the bottom cover 111 and the upper frame 112. Alternatively, the bottom cover 111 is provided with the insertion hole 112a and the upper frame 112 is provided with the mounting hole 111a, i.e., an end of the elastic telescopic column assembly is fixed in the mounting hole 111a of the upper frame 112 and another end of the elastic telescopic column assembly can be inserted into the insertion hole 112a of the bottom cover 111 to achieve detachable connection between the bottom cover 111 and the upper frame 112. Since the elastic telescopic column assembly 113 is extended in the horizontal direction, so that an end of the elastic telescopic column assembly 113 is located in the mounting hole 111a, and another end of the elastic telescopic column assembly 113 is located in the insertion hole 112a, to avoid the upper frame 112 from sliding in the up and down direction relative to the bottom cover 111 and prevent the upper frame 112 from separating from the bottom cover 111.

For example, when the bottom cover 111 is provided with the mounting hole 111a and the upper frame 112 is provided with the insertion hole 112a, during the installation of the bottom cover 111 and the upper frame 112, the user can compress the elastic telescopic column assembly 113 into the mounting hole 111a with one hand, and align the insertion hole 112a of the upper frame 112 with the mounting hole 111a with the other hand and release the elastic telescopic column assembly 113, so that the elastic telescopic column assembly 113 is inserted into the insertion hole 112a of the upper frame 112. Alternatively, a pulling member can be connected to the elastic telescopic column assembly 113, and the pulling member is provided slidably on the bottom cover 111 and penetrates out of the side of the bottom cover 111 away from the insertion hole 112a, so that when the user pulls the pulling member away from the insertion hole 112a, the elastic telescopic column assembly 113 can be retracted into the installation hole 111a, and at the same time, the insertion hole 112a of the upper frame 112 is aligned with the installation hole 111a and the elastic telescopic column assembly 113 is released, so that the elastic telescopic column assembly 113 is inserted into the insertion hole 112a of the upper frame 112.

Figure 4:
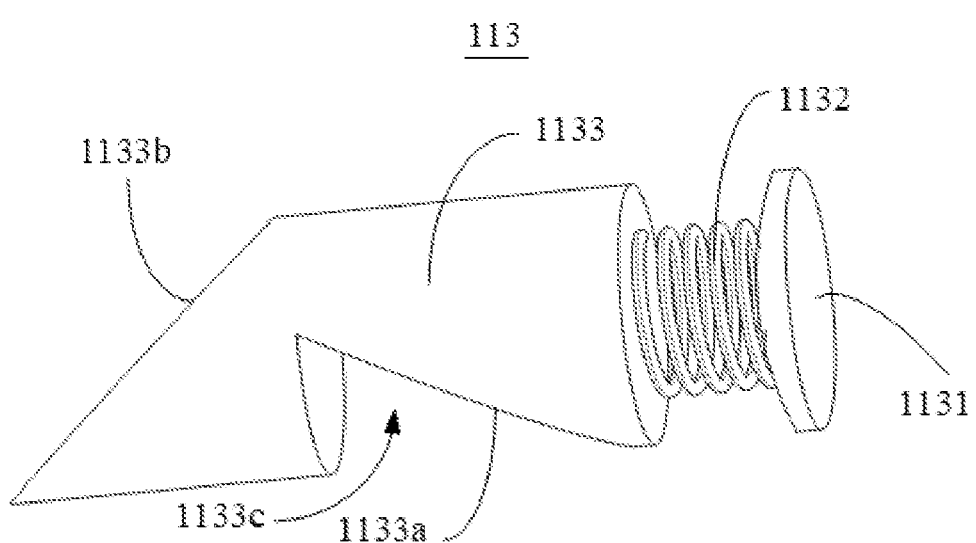
FIG. 4 is a schematic structural view of an elastic telescopic column assembly in a backlight module according to an embodiment of the present application.
Figure 5:
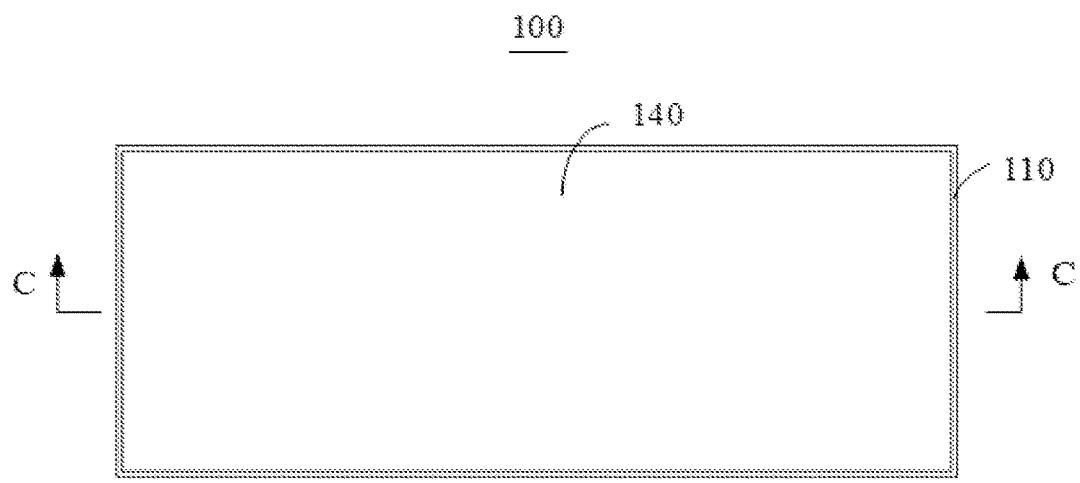
FIG. 5 is a top view of the backlight module according to an embodiment of the present application.

In an example, referring to FIGS. 3 and 4, the bottom cover 111 is provided with a mounting hole 111a, the upper frame 112 is provided with an insertion hole 112a, the elastic telescopic column assembly 113 includes a fixed portion 1131, an elastic member 1132 and a pin 1133. The fixed portion 1131 is fixed in the mounting hole 111a. An end of the elastic member 1132 is connected to the fixed portion 1131; an end of the pin 1133 is connected to the end of the elastic member 1132 away from the fixed portion 111a and is extended horizontally, and another end of the pin 1133 is extendable out of the installation hole 111a and inserted into the insertion hole 112a, or another end of the pin 1133 is retractable into the mounting hole 111a to separate from the insertion hole 112a.

The fixed portion 1131 may be riveted to the bottom cover 111, the mounting hole 111a is the riveted hole in the bottom cover 111. Alternatively, the fixed portion 1131 may also be fixed to the bottom cover 111 by screw connection or welding, and is located in the mounting hole 111a. Since the fixed portion 1131 is provided, the entire elastic telescopic column assembly 113 is easily connected to the bottom cover 111 through the fixed portion 1131, to avoid the risk of difficult installation caused by directly connecting the elastic member 1132 to the mounting hole 111a, thus the elastic member 1132 can provide the elastic force for the pin 1133 extending out of the mounting hole 111a and retracting into the mounting hole 111a, so that the pin 1133 can be automatically inserted into the insertion hole 112a of the upper frame 112 under the elastic force of the elastic member 1132. The elastic member 1132 may be a telescopic spring or a telescopic shrapnel, etc. Of course, in other embodiments, the fixed portion 1131 may also be part of the bottom cover 111, and one end of the elastic member 1132 may be directly connected to the bottom cover 111.

In an embodiment, referring to FIGS. 3 and 4, the bottom cover 111 is provided with an avoidance hole 111b, and the avoidance hole 111b is connected to the mounting hole 111a, and a bottom of the pin 1133 is provided with a mating slot 1133c, and a slot opening of the mating slot 1133c is connected to the avoidance hole 111b, suitable for an operational tool extending into the avoidance hole 111b and the mating slot 1133c for stirring the elastic telescopic column assembly 113.

Since the mating slot 1133c is provided on the bottom of the pin 1133, the bottom cover 111 is provided with the avoidance hole 111b, and the slot opening of the mating slot 1133c is in communication with the avoidance hole 111b, such that the user lets the operational tool pass through the avoidance hole 111 and extend into the mating slot 1133c to stir the elastic telescopic column assembly 113, to drive the pin 1133 to move in the horizontal direction and be inserted into or separated from the mating slot. Since the mating slot 1133c and the avoidance slot are provided, the risk of unevenness on the bottom of the bottom cover 111 caused by the drive member extending out of the bottom cover 111 after the drive member is connected to the pin 1133 can be avoided. Specifically, when the operational tool applies force to the elastic telescopic column assembly 113 to compress the elastic member 1132, the elastic telescopic column assembly 113 as a whole moves in the right direction of FIG. 3, such that the elastic telescopic column assembly 113 as a whole is retracted into the mounting hole 111a of the bottom cover 111, to make the upper frame 112 to separate from the bottom cover 111. It is understood that in this process the operational tool moves to the left relative to the elastic telescopic column assembly 113 until the operational tool is abutted against a highest point of the left wall of the mating slot 1133c when the elastic member 1132 is just at the maximum compressible elastic limit range, so that subsequently the elastic member 1132 can also automatically recover its shape, to drive the pin 1133 to automatically insert into the upper frame 112, to achieve connection between the upper frame 112 and the bottom cover 111.

Specifically, the mating slot 1133c may be a rectangular slot, a triangular slot or a circular arc slot, etc. The user can drive the pin 1133 to move horizontally, and insert a wire-type steel pin into the mating slot 1133c, and the wire-type steel pin moves horizontally to drive the pin 1133 to move horizontally.

Alternatively, in another example, a slot wall of the mating slot 1133c toward the avoidance hole 111b is a first inclined plane 1133a, and a side of the first inclined plane 1133a close to the elastic member 1132 is inclined close to the bottom cover 111.

In such arrangement, when the user drives the pin 1133 to move, it is only necessary to hold the steel pin against the first inclined plane 1133a in a direction perpendicular to a telescopic direction of the elastic member 1132, to drive the pin 1133 to move towards the fixed portion 1131, that is, to achieve the effect of the pin 1133 retracting into the mounting hole 111a to separate from the insertion hole 112a. The drive mode is simple and an aperture of the avoidance hole 111b is smaller.

In an embodiment, referring to FIGS. 3 and 4, an end of the pin 1133 away from the elastic member 1132 is formed with a second inclined plane 1133b, and a side of the second inclined plane 1133b close to the elastic member 1132 is inclined away from the bottom cover 111.

In such arrangement, when the upper frame 112 is mounted with the bottom cover 111, the upper frame 112 can be abutted against the second inclined plane 1133b of the pin 1133 during the movement of the upper frame 112, and the pin 1133 moves in a direction of retracting into the installation hole 111a under the pressure of the upper frame 112, and at the same time, the upper frame 112 slides on the second inclined plane 1133b. When the upper frame 112 slides to the bottom of the second inclined plane 1133b, the pin 1133 slides along the side wall of the upper frame 112 under the action of the elastic member 1132; as the pin 1133 slides along the side wall of the upper frame 112, when the pin 1133 is aligned with the insertion hole 112a of the upper frame 112, the pin 1133 is automatically inserted into the insertion hole 112a under the elastic force of the elastic member 1132 112a, to achieve automatic locking of the upper frame 112 and the bottom cover 111, to make the connection of the upper frame 112 and the bottom cover 111 more convenient and fast, and the installation efficiency is improved, and they or other parts will not be damaged.

In an embodiment, referring to FIGS. 5 to 8, a limiting portion 112b is protruded from the inner edge of the upper frame 112, and the backlight module 100 also includes a support member 120, the support member 120 is detachably connected to the upper frame 112 and is provided on a side of the limiting portion 112b close to the bottom cover 111, and the optical diaphragm 140 is sandwiched between the support member 120 and the limiting portion 112b.

Since the support member 120 is provided, and the support member 120 is detachably connected to the upper frame 112, thus when the optical diaphragm 140 is mounted, the optical diaphragm 140 can be attached to a side of the limiting portion 112b towards the support member 120 first, and then the support member 120 is connected to the upper frame 112. In addition, such arrangement is easy to remove the optical diaphragm 140 from the upper frame 112. When disassembling, the user can first remove the upper frame 112 from the bottom cover 111, and then remove the support member 120 from the upper frame 112, so that the optical diaphragm 140 can be removed from the upper frame 112, and damage to the optical diaphragm 140 and other parts can be avoided during disassembly. The limiting portion 112b in the embodiment not only better limits the optical diaphragm 140 to prevent the optical diaphragm 140 from separating from the upper frame 112 when the upper frame 112 is removed from the bottom cover 111, but also better supports on the display plate 200.

Figure 6:
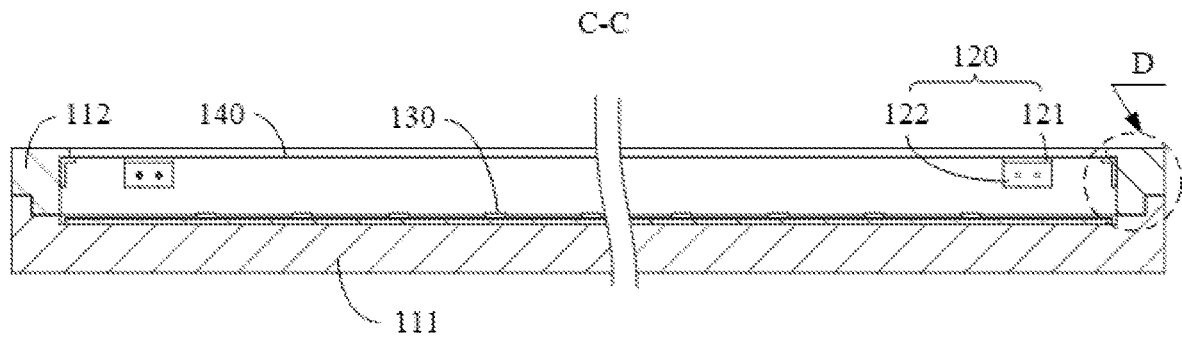
FIG. 6 is a cross-sectional view along line C-C in FIG. 5.
Figure 7:
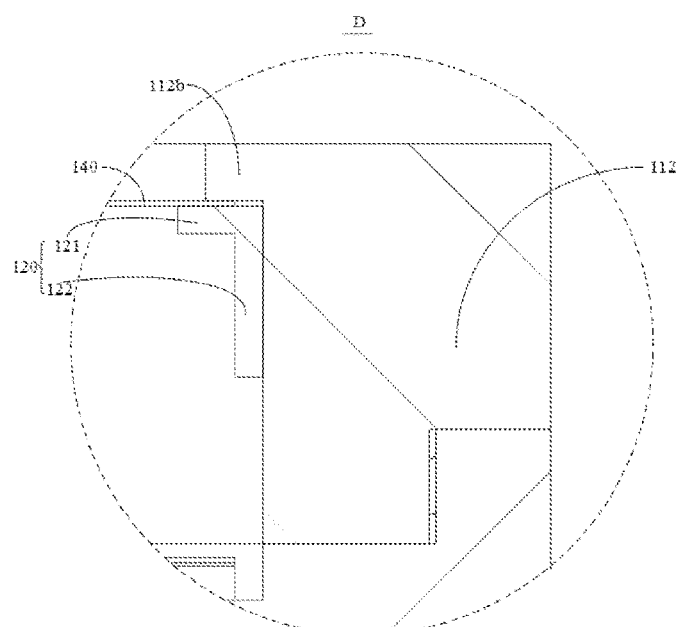
FIG. 7 is a partial enlarged view at position D in FIG. 6.
Figures 8, 9:
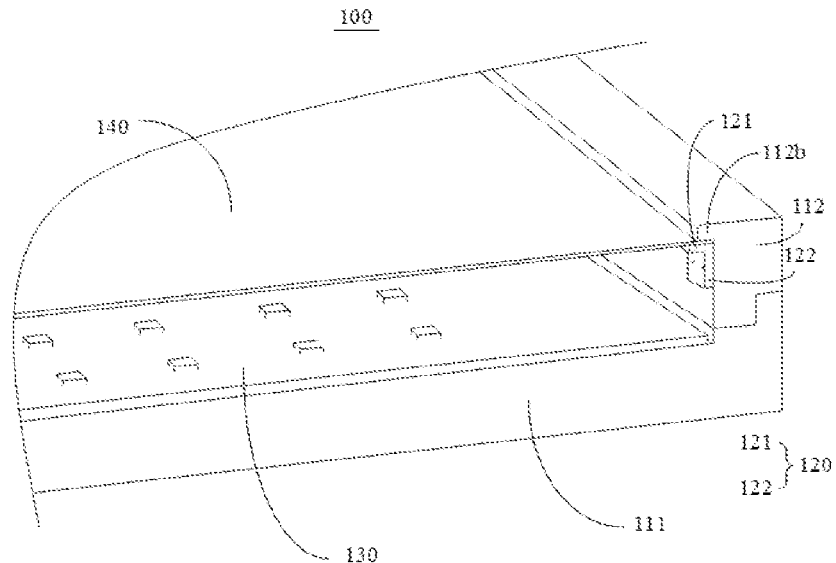
FIG. 8 is a schematic internal structural view of a backlight module according to a first embodiment of the present application.
FIG. 9 is a schematic flowchart of an assembly method of the backlight module according to a second embodiment of the present application.

In an embodiment, referring to FIGS. 6 to 8, the support member 120 includes a support sheet 121 and a connection sheet 122, the support sheet 121 is provided opposite to the limiting portion 112b and is provided on a side of the limiting portion 112b close to the bottom cover 111, and the optical diaphragm 140 is sandwiched between the support sheet 121 and the limiting portion 112b; the connection sheet 122 is vertically connected to the support sheet 121, and the connection sheet 122 is screwed to the upper frame 112.

The support sheet 121 is used to support the optical diaphragm 140 to prevent the optical diaphragm 140 from falling from the upper frame 112 and damaging the lamp plate 130. Since the connection sheet 122 is vertically connected to the support sheet 121, and the connection sheet 122 is screwed to the upper frame 112, to avoid damaging the optical diaphragm 140 when the support member 120 is connected, and to improve the support strength of the support member 120 and facilitate the disassembly of the support member 120 and the upper frame 112, such that the connection between the support member 120 and the upper frame 112 is more firm. In order to have a better support effect, the support member 120 can be made of metal, or the support member 120 can be made of other high-strength plastic material, as long as it can meet the effective support effect of the optical diaphragm 140.

Second Embodiment

The present application also proposes an assembly method of a backlight module, as shown in FIG. 9, the assembly method of the backlight module 100 is based on the specific structure of the backlight module described above, and since the assembly method of the backlight module is based on all the technical solutions of all the above embodiments, it has at least all the beneficial effects brought about by the technical solutions of the above embodiments, which will not be repeated here.

The assembly method of the backlight module includes:

Step S10: providing the backplane 110, the lamp plate 130, and the optical diaphragm 140.

The backplane 110 includes a bottom cover 111 and an upper frame 112 detachably connected, and when the backplane 110 is provided, the backplane 110 can be provided in the state when the bottom cover 111 and the upper frame 112 are connected to each other.

Step S20: disassembling the bottom cover 111 and the upper frame 112 of the backplane 110.

Specifically, the bottom cover 111 and the upper frame 112 of the backplane 110 may be detachably connected, for example, by screw connection, snap connection, or plug connection. When the upper frame 112 is screwed to the bottom cover 111, the bottom of the upper frame 112 can be opened with a threaded hole, and the bottom cover 111 is opened with a through hole in communication with the threaded hole, and the screw is threaded through the through hole and threaded with the threaded hole, to achieve the effect of screwing the upper frame 112 to the bottom cover 111; and when the bottom cover 111 and the upper frame 112 of the back plate 110 need to be disassembled, a screwdriver can be used to unscrew the screw and the bottom cover 111 is separated from the upper frame 112, to achieve the effect of detaching the bottom cover 111 and the upper frame 112 from each other. When the upper frame 112 and the bottom cover 111 are connected by snap, the bottom of the upper frame 112 is nested with the bottom cover 111, and one of the upper frame 112 and the bottom cover 111 is convexly provided with a snap portion, and the other is provided with a snap hole, so that when the upper frame 112 is nested with the bottom cover 111, the snap portion is snapped into the snap hole; when the upper frame 112 and the bottom cover 111 are disassembled, the snap portion can be released from the snap hole by force, to achieve the effect of disassembling the upper frame 112 and the bottom cover 111. When the upper frame 112 and the bottom cover 111 are connected by the pin 1133, the upper frame 112 and the bottom cover 111 are first plugged together, and both the upper frame 112 and the bottom cover 111 are provided with the connection hole, and the pin 1133 is inserted into the connection hole of the upper frame 112 and the connection hole of the bottom cover 111, to achieve detachable connection between the upper frame 112 and the bottom cover 111; and when the upper frame 112 and the bottom cover 111 need to be disassembled, the pins 1133 can be pulled out to separate the upper frame 112 from the bottom cover 111, such that the upper frame 112 and the bottom cover 111 are disassembled from each other.

Step S30: mounting the lamp plate 130 to the bottom cover 111 and the optical diaphragm 140 to the upper frame 112.

After detaching the bottom cover 111 from the upper frame 112, other parts can be mounted on both the bottom cover 111 and the upper frame 112 separately. For the backlight module 100, the lamp plate 130 is provided at the bottom of the optical diaphragm 140, so that the lamp plate 130 can be mounted on the bottom cover 111 and the optical diaphragm 140 on the upper frame 112, thus it is possible to mount the lamp plate 130 and the optical diaphragm 140 at different stations simultaneously. The lamp plate 130 and the optical diaphragm 140 can be mounted at different stations to improve the assembly efficiency of the backlight module 100. In addition, when the lamp plate 130 and/or the optical diaphragm 140 need to be serviced or disassembled separately, it is only necessary to disassemble the bottom cover 111 of the back plate 110 from the upper frame 112, and it is not necessary to remove the adhesive and the display plate 200 before removing the optical diaphragm 140, and even more, it is not necessary to remove the optical diaphragm 140 after removing the adhesive and the display plate 200, to expose the lamp plate 130. Therefore, on the one hand, it improves the efficiency of disassembling the lamp plate 130 and/or the optical diaphragm 140, and on the other hand, it avoids the risk of damage to the optical diaphragm 140, the display plate 200 or other components when removing adhesive. Specifically, the lamp plate 130 is mounted on the bottom cover 111 by screw connection, snap connection, etc. Since the optical diaphragm 140 needs to be set above the lamp plate 130, when the optical diaphragm 140 is mounted on the upper frame 112, the optical diaphragm 140 can be supported by the support member 120, and the support member 120 is detachably connected to the upper frame 112 to not only ensure that the optical diaphragm 140 can be stably supported on the one hand, and but also ensure that the optical diaphragm 140 can be disassembled from the upper frame 112.

Step S40: connecting the bottom cover 111 to the upper frame 112.

When the lamp plate 130 is mounted on the bottom cover 111 and the optical diaphragm 140 is mounted on the upper frame 112, the entire optical module can be assembled by connecting the bottom cover 111 and the upper frame 112.

The present application disassembles the bottom cover 111 and the upper frame 112 of the backplane 110 first, it is easier to mount the lamp plate 130 and the optical diaphragm 140 on the bottom cover 111 and the upper frame 112 respectively, thus the assembly efficiency is higher than the traditional method of mounting the optical diaphragm 140 only after the lamp plate 130 is mounted, and when the lamp plate 130 and/or the optical diaphragm 140 are damaged, only the bottom cover 111 and the upper frame 112 are disassembled, it is not necessary to first remove the adhesive between the backlight module 100 and the display plate 200 and then the optical diaphragm 140 and the lamp plate 130 are taken out in turn, which on the one hand improves the disassembly efficiency and on the other hand reduces the risk of damage to the optical diaphragm 140, the display plate 200 or other components during removing the adhesive.

Third Embodiment

Figure 10:
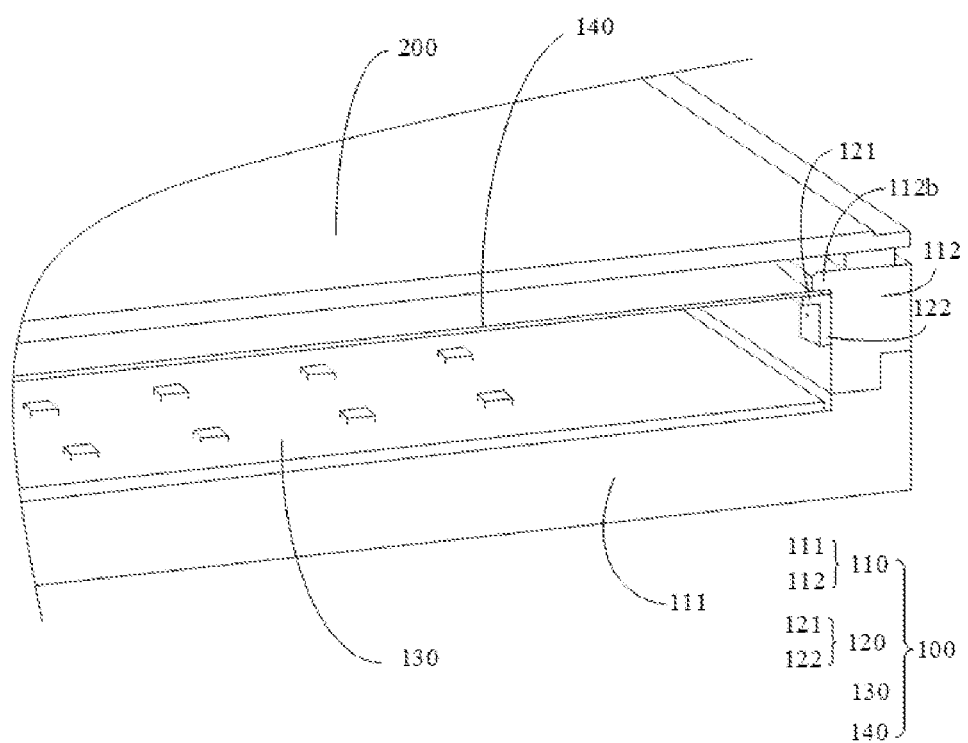
FIG. 10 is a schematic internal structural view of a display according to a third embodiment of the present application.

The present application also proposes a display, as shown in FIG. 10, which includes a display plate 200 and a backlight module 100, and the backlight module 100 adopts the specific structure of the above backlight module 100. Since the present display includes all the technical solutions of all the above embodiments, it has at least all the beneficial effects brought about by the technical solutions of the above embodiments, which will not be repeated here. The display plate 200 is provided on the side of the optical diaphragm 140 away from the lamp plate 130.

The backlight module 100 provides a light source, and the display plate 200 is used to display the screen. Since the display plate 200 is provided on a side of the optical diaphragm 140 away from the light plate 130, i.e., the display plate 200 is provided on a side of the backlight module 100 that emits light, the backlight module 100 can provide light to the display plate 200 for the display plate 200 to display the screen with a certain brightness for the user to view.

The above is only an embodiment of the present application, not to limit the scope of the present application. Any equivalent structural transformation made by using the specification of the present application and the accompanying drawings under the inventive concept of the present application, or direct/indirect application in other related technical fields are included in the scope of the present application.

What is claimed is:

1. A backlight module, comprising a backplane, a lamp plate and an optical diaphragm, wherein the backplane comprises:

a bottom cover; and an upper frame detachably connected above the bottom cover, wherein the lamp plate is mounted on the bottom cover, and the optical diaphragm is mounted on the upper frame and opposite to the lamp plate;

one of the bottom cover and the upper frame is provided with a mounting hole, and the other of the bottom cover and the upper frame is provided with an insertion hole;

the backlight module further comprises an elastic telescopic column assembly extending in a horizontal direction;

an end of the elastic telescopic column assembly is fixed in the mounting hole, and another end of the elastic telescopic column assembly is extendable out of the mounting hole and extended into the insertion hole; or another end of the elastic telescopic column assembly is retractable into the mounting hole to separate from the insertion hole;

the bottom cover is provided with the mounting hole, and the upper frame is provided with the insertion hole;

the elastic telescopic column assembly comprises a fixed portion, an elastic member, and a pin;

the fixed portion is fixed in the mounting hole, an end of the elastic member is connected to the fixed portion; and an end of the pin is connected to an end of the elastic member away from the fixed portion and is extended horizontally, another end of the pin is extendable out of the mounting hole and extended into the insertion hole; or another end of the pin is retractable into the mounting hole to separate from the insertion hole.

2. The backlight module according to claim 1, wherein:

the bottom cover is provided with an avoidance hole, the avoidance hole is in communication with the mounting hole, a bottom of the pin is provided with a mating slot; and a slot opening of the mating slot is in communication with the avoidance hole, suitable for an operational tool extending into the avoidance hole and for the mating slot stirring the elastic telescopic column assembly.

3. The backlight module according to claim 2, wherein a slot wall of the mating slot towards the avoidance hole is a first inclined plane, and a side of the first inclined plane close to the elastic member is inclined close to the bottom cover.

4. The backlight module according to claim 3, wherein an end of the pin away from the elastic member is formed with a second inclined plane, and a side of the second inclined plane close to the elastic member is inclined away from the bottom cover.

5. An assembly method of the backlight module according to claim 1, comprising:

providing the backplane, the lamp plate, and the optical diaphragm;

disassembling the bottom cover and the upper frame of the backplane;

mounting the lamp plate to the bottom cover and the optical diaphragm to the upper frame; and connecting the bottom cover to the upper frame.

6. A display, comprising a display plate and the backlight module according to claim 1, wherein the display plate is provided on the side of the optical diaphragm away from the lamp plate.

* * * * *